F. SPEES.

Improvement in Well Augers.

No. 123,847.    Patented Feb. 20, 1872.

Witnesses:
A Bennerendorf.
Francis McArdle

Inventor:
Francis Spees.
Per Mmm & Co.
Attorneys.

UNITED STATES PATENT OFFICE.

FRANCIS SPEES, OF TABOR, IOWA.

IMPROVEMENT IN WELL-AUGERS.

Specification forming part of Letters Patent No. 123,847, dated February 20, 1872.

*To all whom it may concern:*

Be it known that I, FRANCIS SPEES, of Tabor, in the county of Fremont and State of Iowa, have invented a new and useful Improvement in Earth-Boring Auger; and I do hereby declare that the following is a full, clear, and exact description thereof, which will enable others skilled in the art to make and use the same, reference being had to the accompanying drawing forming part of this specification.

Figure 1:
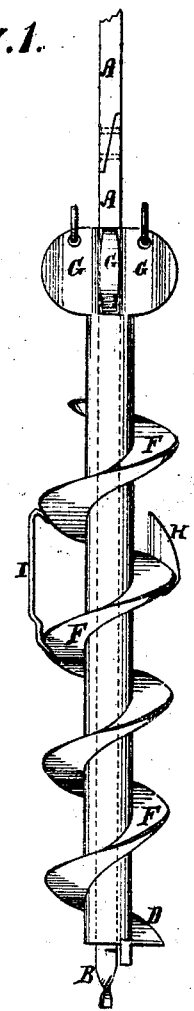
Figure 2:
Figure 4:
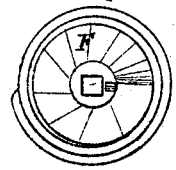
Figure 3:

Figure 1 is a side view of my improved earth-boring auger. Fig. 2 is a detail side view of the lower part of the stem. Fig. 3 is a top view of the same. Fig. 4 is a view of the lower end of the detachable worm detached.

Similar letters of reference indicate corresponding parts.

My invention has for its object to furnish an improved auger for boring wells and for other earth-boring purposes, which shall be simple in construction, convenient in use, and effective in operation; and it consists in the construction and combination, as hereinafter more fully described.

A is the stem, to which the power is applied in boring, and which is made in lengths, secured together by screw-bolts, as shown in Fig. 1, so that the stem can be extended to any desired length. The stem A is made square or of other angular shape, and upon its lower end is formed, or to it is attached, a point, B, to enter the ground and center the auger. To the lower end of the stem A, at right angles with each other and the one a little above the other, are attached two short horizontal posts, C, to which are securely bolted a short section, D, of a worm, the lower edge of which is turned downward and inward to lead the auger forward into the ground. Upon the edge of the lower or forward part of the section D is formed an upwardly-projecting angular bit, E, to shave off the side of the hole and leave it smooth, so that the worm and dirt can be readily withdrawn. F is the worm, the stem of which is made hollow, and of such a shape as to fit onto the stem A and be carried around by and with said stem in its revolution, while at the same time the said worm may be raised upon the said stem to discharge the dirt and again lowered to its place without raising the said stem from the hole, thus avoiding the labor and delay of separating the parts of the stem every time the auger is raised to discharge the dirt and putting them together again every time the auger is lowered. To enable the worm to be raised and lowered easily for discharging the dirt, I prefer to make it a little less in diameter than the section of worm D attached to the lower end of the stem A. The friction of the worm F upon the stem A while being raised and lowered may be diminished by friction-wheels or rollers, if desired. To the upper end of the hollow stem of the worm F are attached, or upon it are formed, lugs or rounded vertical flanges G, which rest against the side of the hole and keep the worm vertical and steady while being raised and lowered, and at the same time serve for the attachment of the chains by which the said worm is raised and lowered.

If desired—and this construction I prefer—the upper part of the worm F may be made of a larger diameter than the lower part, so as to ream out or enlarge the hole, part of the dirt being thus received upon the upper part of the worm, thus diminishing the friction of the dirt upon the worm, and, consequently, the power required to operate the auger. In this case, a lip, H, should be attached to the edge of the lower end of the enlarged part of the worm, to shave off the sides of the hole and leave them smooth. The hole may also be reamed out by a projecting vertical knife, I, the ends of which are bent inward and are attached to the flange or thread of the worm F, as shown in Fig. 1. By this construction, when a hard stratum of earth is found the knife I may be detached and a smaller hole bored through said stratum, the knife I being afterward attached and the hole reamed out or enlarged to the desired size.

Having thus described my invention, I claim as new and desire to secure by Letters Patent—

The combination, with the stem A, of the rigid section D, (of the worm,) the angular bit E, and the sliding worm F, as and for the purpose described.

FRANCIS SPEES.

Witnesses:
 DANIEL B. SPEES,
 WILLIAM E. SHERFEY.